United States Patent [19]
Stelman

[11] Patent Number: 5,937,031
[45] Date of Patent: Aug. 10, 1999

[54] SMART INTERFACE TECHNOLOGY

[75] Inventor: Bruce W. Stelman, San Jose, Calif.

[73] Assignee: Hello Direct, Inc., San Jose, Calif.

[21] Appl. No.: 09/124,687

[22] Filed: Jul. 29, 1998

Related U.S. Application Data

[62] Division of application No. 08/625,398, Mar. 27, 1996.

[51] Int. Cl.[6] .............................. H04M 1/24; H04M 3/08; H04M 3/22
[52] U.S. Cl. ................................... 379/1; 379/27; 379/32; 379/399; 379/441
[58] Field of Search .................................. 379/1, 32, 343, 379/423, 442, 443, 27, 399, 441; 370/252, 359, 385

[56] References Cited

U.S. PATENT DOCUMENTS

| Re. 35,536 | 6/1997 | Irissou et al. ............................. | 379/395 |
|---|---|---|---|
| D. 312,627 | 12/1990 | Gutzmer .................................. | D14/107 |
| 3,566,271 | 2/1971 | Whang et al. ............................. | 325/65 |
| 3,715,513 | 2/1973 | Miller .................................. | 179/18 AD |
| 3,865,995 | 2/1975 | Kerman et al. ............................ | 179/99 |
| 3,892,924 | 7/1975 | Vachon ................................. | 179/15 BY |
| 3,943,305 | 3/1976 | Hagedorn .......................... | 179/175.3 R |
| 3,969,680 | 7/1976 | Wermuth .................................. | 330/29 |
| 4,055,729 | 10/1977 | Vandling .................................. | 179/2 C |

(List continued on next page.)

FOREIGN PATENT DOCUMENTS

| 0 298 719 A2 | 1/1989 | European Pat. Off. ......... | H04M 9/08 |
|---|---|---|---|
| 0 331 838 A2 | 9/1989 | European Pat. Off. ......... | H04M 9/00 |
| 0 376 582 B1 | 7/1990 | European Pat. Off. ......... | H04M 9/08 |
| 0 376 589 B1 | 7/1990 | European Pat. Off. ......... | H04M 9/08 |
| 0 400 979 B1 | 12/1990 | European Pat. Off. ......... | H04M 9/08 |
| 34 10 145 A1 | 10/1985 | Germany ....................... | H04M 3/42 |
| 41 30 045 A1 | 3/1993 | Germany ....................... | H04M 9/08 |

(List continued on next page.)

OTHER PUBLICATIONS

Signetics Linear Products, TEA 1060/61 Product Specification, pp. 6–102 to 6–112, Aug. 1, 1988.
Precision Components, Inc., product advertisment for Data Switch, Teleconnect, p. 147, May 1988.
TVMP, Inc., product advertisement for PHONEFLEX, PC Week, p. 113, Jun. 1988.
A–JEM, product brochure, "Look here for your Hook–Up", Jan. 1988.
Walker Equipment Corp., product advertisement for W10 Receiver Amplifier, Telephony, p. 65, Sep. 8, 1986.
K.D. Witt, "Switch Box For Voice/Data Communication," IBM Technical Disclosure Bulletin, vol. 14, No. 5, Oct. 1971.

Primary Examiner—Curtis A. Kuntz
Assistant Examiner—Binh K. Tieu
Attorney, Agent, or Firm—Haverstock & Owens LLP

[57] ABSTRACT

The present invention overcomes interface problems between proprietary handset ports on telephone base units and voice/data accessory products by allowing a user to automatically calibrate the telephone accessory product for an optimal interface match with the intended telephone base unit. This is accomplished through the use of a "Smart Interface Technology" (SIT) integrated chip set consisting of a full custom analog and semi-custom digital integrated circuit. The SIT incorporates three different methods for "learning" the characteristics of 4-wire port modular interfaces found in all telephone station sets. Basically, these methods determine the appropriate 4-wire terminal configurations, the transmit and receive channels of the intended telephone base unit, and adjust the channel sensitivities until an optimal and clear signal is provided for the user.

12 Claims, 8 Drawing Sheets

U.S. PATENT DOCUMENTS

| | | | |
|---|---|---|---|
| 4,088,844 | 5/1978 | Kinnaird, Jr. | 179/99 |
| 4,096,362 | 6/1978 | Crawford | 179/170 D |
| 4,101,735 | 7/1978 | Bridenbaugh | 179/1 HF |
| 4,119,922 | 10/1978 | Schröder | 330/86 |
| 4,142,075 | 2/1979 | Olschewski | 179/170 NC |
| 4,153,916 | 5/1979 | Miwa et al. | 358/257 |
| 4,160,122 | 7/1979 | Jacobson | 179/1 A |
| 4,161,633 | 7/1979 | Treiber | 179/170.2 |
| 4,278,848 | 7/1981 | Rizzo et al. | 179/170 D |
| 4,284,859 | 8/1981 | Araseki | 179/170 NC |
| 4,319,092 | 3/1982 | van den Enden et al. | 179/18 FA |
| 4,367,374 | 1/1983 | Serrano | 179/2 C |
| 4,368,361 | 1/1983 | Chung et al. | 179/170.2 |
| 4,368,362 | 1/1983 | Chung et al. | 179/170.2 |
| 4,387,271 | 6/1983 | Artom | 179/2 DP |
| 4,425,664 | 1/1984 | Sherman et al. | 375/8 |
| 4,431,871 | 2/1984 | Gupta | 179/84 A |
| 4,446,335 | 5/1984 | Lee et al. | 179/2 C |
| 4,488,003 | 12/1984 | Nishimura | 179/2 C |
| 4,488,007 | 12/1984 | Chataignon et al. | 179/81 B |
| 4,506,112 | 3/1985 | Bitsch | 179/81 R |
| 4,567,332 | 1/1986 | Jamison | 179/175 |
| 4,588,856 | 5/1986 | Cohen | 179/2 C |
| 4,606,044 | 8/1986 | Kudo | 375/13 |
| 4,617,656 | 10/1986 | Kobayashi et al. | 370/74 |
| 4,636,584 | 1/1987 | Binkerd et al. | 379/240 |
| 4,677,667 | 6/1987 | Burns | 379/398 |
| 4,696,032 | 9/1987 | Levy | 379/390 |
| 4,697,282 | 9/1987 | Winter et al. | 379/67 |
| 4,712,231 | 12/1987 | Julstrom | 379/202 |
| 4,759,054 | 7/1988 | Mellon | 379/145 |
| 4,759,059 | 7/1988 | Christensen | 379/161 |
| 4,782,524 | 11/1988 | McQuinn et al. | 379/395 |
| 4,788,708 | 11/1988 | Hendrix | 379/6 |
| 4,788,720 | 11/1988 | Brennan et al. | 379/201 |
| 4,815,121 | 3/1989 | Yoshida | 379/67 |
| 4,825,465 | 4/1989 | Ryan | 379/399 |
| 4,852,153 | 7/1989 | Streck | 379/100 |
| 4,852,160 | 7/1989 | Kiko et al. | 379/405 |
| 4,856,049 | 8/1989 | Streck | 379/67 |
| 4,864,567 | 9/1989 | Giorgio | 370/118 |
| 4,876,712 | 10/1989 | Brint et al. | 379/387 |
| 4,879,738 | 11/1989 | Petro | 379/3 |
| 4,879,746 | 11/1989 | Young et al. | 379/399 |
| 4,881,129 | 11/1989 | Mitsuhashi | 358/434 |
| 4,887,288 | 12/1989 | Erving | 379/6 |
| 4,893,331 | 1/1990 | Horiuchi et al. | 379/93 |
| 4,894,860 | 1/1990 | Korsky et al. | 379/240 |
| 4,894,863 | 1/1990 | Navratil et al. | 379/395 |
| 4,901,346 | 2/1990 | Erving | 379/389 |
| 4,907,267 | 3/1990 | Gutzmer | 379/442 |
| 4,914,690 | 4/1990 | Hagedorn | 379/233 |
| 4,918,726 | 4/1990 | Snyder | 379/395 |
| 4,928,306 | 5/1990 | Biswas et al. | 379/201 |
| 4,930,156 | 5/1990 | Norris | 379/388 |
| 4,932,047 | 6/1990 | Emmons et al. | 379/53 |
| 4,939,767 | 7/1990 | Saito et al. | 379/53 |
| 4,951,002 | 8/1990 | Hanon | 330/151 |
| 4,951,312 | 8/1990 | Tanikawa et al. | 379/394 |
| 4,975,949 | 12/1990 | Wimsatt et al. | 379/387 |
| 4,984,262 | 1/1991 | Kumozaki et al. | 379/5 |
| 4,984,265 | 1/1991 | Connan et al. | 379/390 |
| 4,989,243 | 1/1991 | Choi | 379/402 |
| 4,991,196 | 2/1991 | Krebs | 379/27 |
| 4,993,060 | 2/1991 | Kelly | 379/55 |
| 4,996,706 | 2/1991 | Cho | 379/93 |
| 4,996,710 | 2/1991 | Takahashi et al. | 379/202 |
| 5,001,746 | 3/1991 | Nishijima | 379/99 |
| 5,003,580 | 3/1991 | Duong et al. | 379/93 |
| 5,014,299 | 5/1991 | Klupt et al. | 379/98 |
| 5,016,271 | 5/1991 | Ford | 379/410 |
| 5,018,184 | 5/1991 | Abrams et al. | 379/29 |
| 5,029,203 | 7/1991 | Ikefuji et al. | 379/391 |
| 5,034,978 | 7/1991 | Nguyen et al. | 379/402 |
| 5,036,536 | 7/1991 | Hanon et al. | 379/387 |
| 5,058,155 | 10/1991 | Larsen | 379/442 |
| 5,059,141 | 10/1991 | Scott | 439/638 |
| 5,070,527 | 12/1991 | Lynn | 379/395 |
| 5,073,919 | 12/1991 | Hagensick | 379/29 |
| 5,097,501 | 3/1992 | Kutzavitch | 379/165 |
| 5,131,032 | 7/1992 | Esaki et al. | 379/410 |
| 5,133,006 | 7/1992 | Khuat | 379/399 |
| 5,133,007 | 7/1992 | Nishimura | 379/405 |
| 5,151,936 | 9/1992 | Riedle | 379/403 |
| 5,164,982 | 11/1992 | Davis | 379/96 |
| 5,170,430 | 12/1992 | Schuh | 379/389 |
| 5,172,411 | 12/1992 | Gazsi | 379/402 |
| 5,175,763 | 12/1992 | Gazsi | 379/402 |
| 5,179,586 | 1/1993 | Lee | 379/93 |
| 5,185,789 | 2/1993 | Hanon et al. | 379/395 |
| 5,191,606 | 3/1993 | Juang | 379/391 |
| 5,206,898 | 4/1993 | Nishijima | 379/90 |
| 5,210,784 | 5/1993 | Wang et al. | 379/37 |
| 5,229,721 | 7/1993 | Stade | 330/265 |
| 5,235,637 | 8/1993 | Kraz et al. | 379/387 |
| 5,237,605 | 8/1993 | Peak et al. | 379/399 |
| 5,239,579 | 8/1993 | Schuh | 379/395 |
| 5,249,218 | 9/1993 | Sainton | 379/59 |
| 5,289,459 | 2/1994 | Brownlie | 370/17 |
| 5,289,538 | 2/1994 | Lauer et al. | 379/402 |
| 5,303,308 | 4/1994 | Larsen et al. | 381/106 |
| 5,321,745 | 6/1994 | Drory et al. | 379/351 |
| 5,323,449 | 6/1994 | Mori et al. | 379/100 |
| 5,323,451 | 6/1994 | Yatsunami | 379/100 |
| 5,333,171 | 7/1994 | Wang et al. | 379/37 |
| 5,333,194 | 7/1994 | Caesar | 379/402 |
| 5,353,347 | 10/1994 | Irissou et al. | 379/395 |
| 5,357,569 | 10/1994 | Garcia et al. | 379/399 |
| 5,365,577 | 11/1994 | Davis et al. | 379/96 |
| 5,396,550 | 3/1995 | Kim | 379/390 |
| 5,396,551 | 3/1995 | Lucey | 379/395 |
| 5,398,282 | 3/1995 | Forrester et al. | 379/391 |
| 5,422,950 | 6/1995 | Miller et al. | 379/399 |
| 5,444,243 | 8/1995 | Kohhashi et al. | 250/305 |
| 5,444,770 | 8/1995 | Davis et al. | 379/99 |
| 5,448,646 | 9/1995 | Lucey et al. | 381/74 |
| 5,454,036 | 9/1995 | Gleeman et al. | 379/392 |
| 5,455,859 | 10/1995 | Gutzmer | 379/442 |
| 5,471,523 | 11/1995 | Smith et al. | 379/165 |
| 5,471,528 | 11/1995 | Reesor | 379/390 |
| 5,471,650 | 11/1995 | Vexler et al. | 455/69 |
| 5,473,676 | 12/1995 | Frick et al. | 379/99 |
| 5,493,609 | 2/1996 | Winseck, Jr. et al. | 379/96 |
| 5,495,527 | 2/1996 | Rollhaus, Jr. et al. | 379/387 |
| 5,526,419 | 6/1996 | Allen et al. | 379/387 |
| 5,528,685 | 6/1996 | Cwynar et al. | 379/405 |
| 5,533,092 | 7/1996 | Kaziwara | 379/21 |
| 5,533,119 | 7/1996 | Adair et al. | 379/391 |
| 5,544,243 | 8/1996 | Papadopoulos | 379/413 |
| 5,550,901 | 8/1996 | Williams | 379/93 |
| 5,550,913 | 8/1996 | McMaster et al. | 379/230 |
| 5,555,300 | 9/1996 | Gutzmer | 379/395 |
| 5,557,669 | 9/1996 | Perry et al. | 379/339 |
| 5,557,670 | 9/1996 | Perry et al. | 379/339 |
| 5,557,672 | 9/1996 | Perry et al. | 379/399 |
| 5,577,115 | 11/1996 | Deutsch et al. | 379/399 |
| 5,583,922 | 12/1996 | Davis et al. | 379/96 |
| 5,586,181 | 12/1996 | Kiko | 379/399 |
| 5,621,731 | 4/1997 | Dale et al. | 370/79 |
| 5,623,544 | 4/1997 | Papadopoulos | 379/413 |
| 5,625,679 | 4/1997 | Gutzmer | 379/99 |
| 5,629,926 | 5/1997 | Deutsch et al. | 379/385 |

| | | | |
|---|---|---|---|
| 5,631,955 | 5/1997 | Adams et al. | 379/387 |
| 5,687,228 | 11/1997 | Ellington, Jr. et al. | 379/395 |
| 5,729,603 | 3/1998 | Huddart et al. | 379/387 |
| 5,734,713 | 3/1998 | Mauney et al. | 379/395 |
| 5,825,873 | 10/1998 | Duncan et al. | 379/399 |

FOREIGN PATENT DOCUMENTS

| | | | |
|---|---|---|---|
| 42 28 479 A1 | 3/1994 | Germany | H04M 1/58 |
| 44 30 189 A1 | 2/1996 | Germany | H04M 9/08 |
| 195 43 666 A1 | 5/1997 | Germany | H04B 3/23 |
| WO 93/03561 | 2/1993 | WIPO | H04L 1/20 |
| WO 97/36411 | 10/1997 | WIPO | H04M 1/00 |

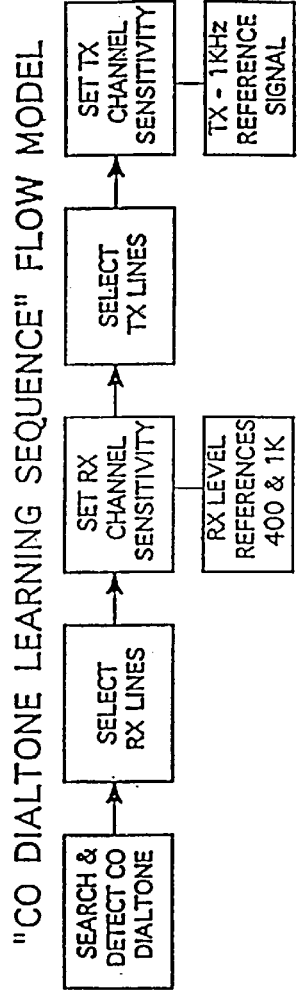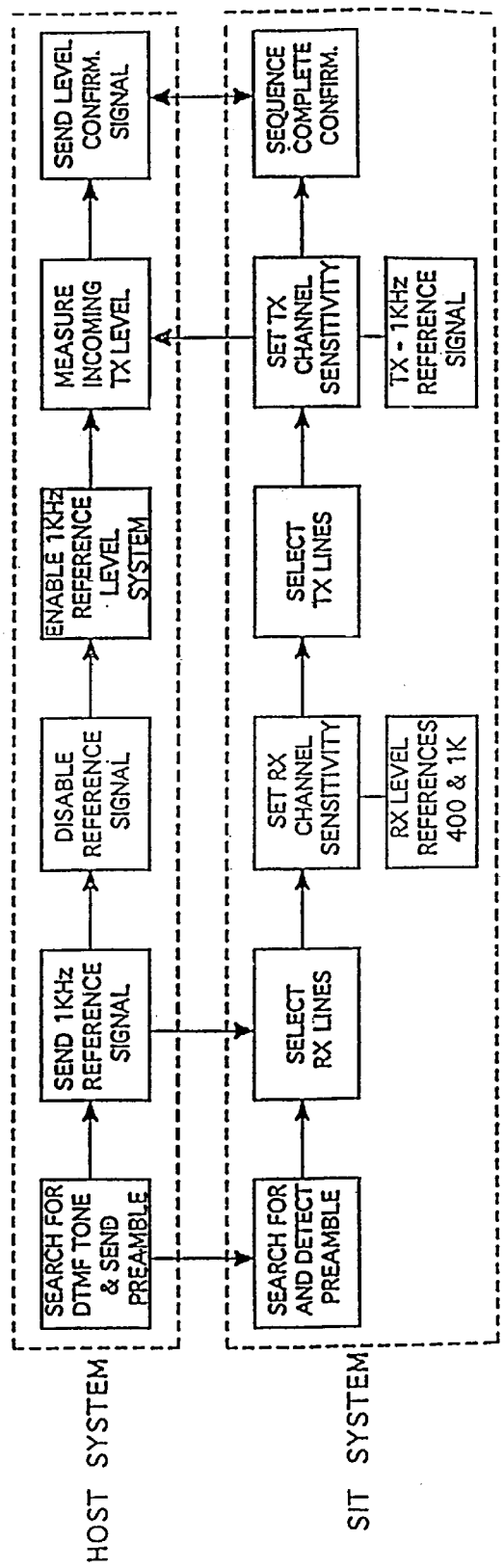

Smart Interface Technology (SIT) Project
Preliminary Line Configuration Switching Algorithms and Model

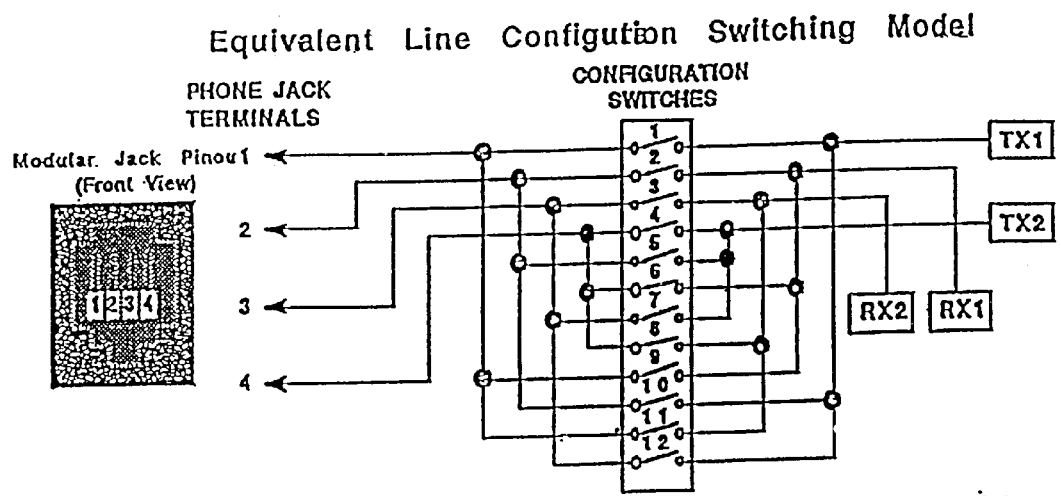

| Dialtone Detection | Rx Pinout | Tx Pinout Sequence | Algorithm Ref. No. | Model Sw. "ON" |
|---|---|---|---|---|
| Pins 2 & 3 | Pins 2 & 3 | Pins 1 & 4 (Primary) | 1 | 1,2,3,4 |
| Pins 2 & 3 | Pins 2 & 3 | Pins 1 & 2 (2nd Try) | 2 | 1,2,3,5 |
| Pins 2 & 3 | Pins 2 & 3 | Pins 1 & 3 (3rd Try) | 3 | 1,2,3,7 |
| Pins 2 & 3 | Pins 2 & 3 | Pins 4 & 2 (4th Try) | 4 | 2,3,4,10 |
| Pins 2 & 3 | Pins 2 & 3 | Pins 4 & 3 (5th Try) | 5 | 2,3,4,12 |
| Pins 2 & 4 | Pins 2 & 4 | Pins 1 & 3 (Primary) | 6 | 1,2,7,8 |
| Pins 2 & 4 | Pins 2 & 4 | Pins 1 & 2 (2nd Try) | 7 | 1,2,5,8 |
| Pins 2 & 4 | Pins 2 & 4 | Pins 1 & 4 (3rd Try) | 8 | 1,2,4,8 |
| Pins 2 & 4 | Pins 2 & 4 | Pins 3 & 2 (4th Try) | 9 | 2,5,8,12 |
| Pins 2 & 4 | Pins 2 & 4 | Pins 3 & 4 (5th Try) | 10 | 2,4,8,12 |
| Pins 1 & 2 | Pins 1 & 2 | Pins 3 & 4 (Primary) | 11 | 2,4,11,12 |
| Pins 1 & 2 | Pins 1 & 2 | Pins 3 & 1 (2nd Try) | 12 | 1,2,11,12 |
| Pins 1 & 2 | Pins 1 & 2 | Pins 3 & 2 (3rd Try) | 13 | 2,5,11,12 |
| Pins 1 & 2 | Pins 1 & 2 | Pins 4 & 1 (4th Try) | 14 | 1,2,4,11 |
| Pins 1 & 2 | Pins 1 & 2 | Pins 4 & 2 (5th Try) | 15 | 2,4,10,11 |
| Pins 1 & 3 | Pins 1 & 3 | Pins 2 & 4 (Primary) | 16 | 3,4,9,11 |
| Pins 1 & 3 | Pins 1 & 3 | Pins 2 & 1 (2nd Try) | 17 | 1,3,5,9 |
| Pins 1 & 3 | Pins 1 & 3 | Pins 2 & 3 (3rd Try) | 18 | 3,5,9,12 |
| Pins 1 & 3 | Pins 1 & 3 | Pins 4 & 1 (4th Try) | 19 | 1,3,4,9 |
| Pins 1 & 3 | Pins 1 & 3 | Pins 4 & 3 (5th Try) | 20 | 3,4,9,12 |

*FIG. 4*

| Dialtone Detection | Rx Pinout | Tx Pinout Sequence | Algorithm Ref. No. | Model Sw. "ON" |
|---|---|---|---|---|
| Pins 1 & 4 | Pins 1 & 4 | Pins 2 & 3 (Primary) | 21 | 7,8,9,10 |
| Pins 1 & 4 | Pins 1 & 4 | Pins 2 & 1 (2nd Try) | 22 | 1,5,8,9 |
| Pins 1 & 4 | Pins 1 & 4 | Pins 2 & 4 (3rd Try) | 23 | 4,8,9,10 |
| Pins 1 & 4 | Pins 1 & 4 | Pins 3 & 1 (4th Try) | 24 | 1,7,8,9 |
| Pins 1 & 4 | Pins 1 & 4 | Pins 3 & 4 (5th Try) | 25 | 4,8,9,12 |
| Pins 3 & 4 | Pins 3 & 4 | Pins 1 & 2 (Primary) | 26 | 1,3,5,6 |
| Pins 3 & 4 | Pins 3 & 4 | Pins 1 & 3 (2nd Try) | 27 | 1,3,6,7 |
| Pins 3 & 4 | Pins 3 & 4 | Pins 1 & 4 (3rd Try) | 28 | 1,3,4,6 |
| Pins 3 & 4 | Pins 3 & 4 | Pins 2 & 3 (4th Try) | 29 | 3,6,7,10 |
| Pins 3 & 4 | Pins 3 & 4 | Pins 2 & 4 (5th Try) | 30 | 3,4,6,10 |

| ALGORITHM REF. NUMBER | SWITCHING MODEL ACTION | ALGORITHM REF. NUMBER | SWITCHING MODEL ACTION |
|---|---|---|---|
| 31 | Switch 1: "ON" | 43 | Switch 7: "ON" |
| 32 | Switch 1: "OFF" | 44 | Switch 7: "OFF" |
| 33 | Switch 2: "ON" | 45 | Switch 8: "ON" |
| 34 | Switch 2: "OFF" | 46 | Switch 8: "OFF" |
| 35 | Switch 3: "ON" | 47 | Switch 9: "ON" |
| 36 | Switch 3: "OFF" | 48 | Switch 9: "OFF" |
| 37 | Switch 4: "ON" | 49 | Switch 10: "ON" |
| 38 | Switch 4: "OFF" | 50 | Switch 10: "OFF" |
| 39 | Switch 5: "ON" | 51 | Switch 11: "ON" |
| 40 | Switch 5: "OFF" | 52 | Switch 11: "OFF" |
| 41 | Switch 6: "ON" | 53 | Switch 12: "ON" |
| 42 | Switch 6: "OFF" | 54 | Switch 12: "OFF" |

NOTES:
1) Algorithm No. 1 will be the default setting for system power-up, hard or soft resets and "learning" timeout conditions.
2) Ideally all 12 equivalent switches can be selected and switched "on" or "off" independant of the above algorithm's.

FIG. 5

SMART INTERFACE TECHNOLOGY

This is a division of U.S. patent application Ser. No. 08/625,398, filed Mar. 27, 1996, the contents of which are hereby incorporated by reference.

FIELD OF THE INVENTION

This invention relates to the field of telephony. More particularly, this invention relates to a device capable of providing a 4-wire interface to any telephone base unit's handset/headset port using 2-wire each send and receive lines.

BACKGROUND OF THE INVENTION

For purposes of this discussion, a telephone network can be considered as being divided into two parts. The first part comprises everything from the telephone company leading up to and including the Central Office (CO) termination point in a subscriber's home or office. The second part comprises everything from the Central Office termination point and includes the individual telephone sets connected directly to this termination point as well as proprietary systems (Key/PBX) and their respective proprietary telephone sets.

Everything within the first part is regulated by the Federal Communications Commission (FCC) and therefore has a standard to which telephone set and system manufacturers must base their interface equipment. This includes all devices connecting directly to the Central Office telephone network, including telephone sets and telephone systems. One problem that the telephony industry faces is that the other parts of the telephone network are not regulated, including anything related to the telephone sets which is not connected directly to the telephone network, such as proprietary telephone sets and all hand sets.

Private phones generally include a telephone base unit and modular accessories, such as a handset/headset. Accordingly, telephone manufacturers can and do develop independent interface systems between their telephone base units and accessories such as handsets/headsets. This often precludes the use of a different type of handset/headset with a particular base unit without manual reprogramming. The problem is especially apparent when dealing with Key and Private Branch Exchange (PBX) system station sets which are entirely proprietary in nature. Many manufacturers are providing accessories which are provided as original equipment with the base unit. Many of these accessory products provide both voice and data solutions not offered in the telephone station sets such as headset, teleconferencing, facsimile and modem communication alternatives.

What is needed is an invention that will allow a user to automatically calibrate a commercially available non-regulated voice/data product to allow an effective interface. This would solve any incompatibility problems and provide users with greater choices and flexibility when selecting telephone equipment.

SUMMARY OF THE INVENTION

The present invention overcomes interface problems between proprietary handset ports on telephone base units and voice/data accessory products by allowing a user to automatically calibrate the telephone accessory product for an optimal interface match with the intended telephone base unit. This is accomplished through the use of a "Smart Interface Technology" (SIT) integrated chip set consisting of a full custom analog and semi-custom digital integrated circuit. The SIT incorporates three different methods for "learning" the characteristics of 4-wire port modular interfaces found in most telephone station sets. These methods determine the appropriate 4-wire terminal configurations, the transmit and receive channels of the intended telephone base unit, and adjust the channel sensitivities until an optimal and clear signal is provided for the user.

BRIEF DESCRIPTION OF THE DRAWINGS

FIG. 1 illustrates a flow model of a "Central Office (CO) Dialtone Learning Sequence."

FIG. 2 illustrates a flow model of the "Automated 800 Learning Sequence."

FIG. 4 illustrates switching algorithms for the system.

FIG. 5 is a continuation of the switching algorithms of FIG. 4.

DETAILED DESCRIPTION OF THE PREFERRED EMBODIMENT

FIG. 1 is a flow model of the "CO Dialtone Learning Sequence." This is the primary method the SIT system uses to "learn" the characteristics of the telephone interface. The "CO Dialtone Learning Sequence" is automatic and transparent to the end user.

Upon initial system power-up, such as the first time batteries are installed, a "CO Dialtone Search" routine is enabled to detect and locate a CO dialtone signal on any combination of the 4-wire interface lines from the telephone base unit. When the CO dialtone is detected, the "CO Dialtone Learning Sequence" will be fully enabled.

The "CO Dialtone Learning Sequence" is a one time activation process. After a successful "learn sequence" has been executed, the appropriate bit addressable latch 1 settings are stored from the digital MCU 100 into the EEPROM 300, in order to maintain the correct settings in the event of a power failure. Subsequent CO dialtones will not enable the learning sequence unless a system reset is performed to re-enable the learning routine. The "CO Dialtone Learning Sequence" is re-enabled by a user depressing the system reset switch 258 for a minimum of five seconds or by a soft system reset which is accessed remotely.

The "CO Dialtone Learning Sequence" starts with the location of the CO dialtone. Location of the CO dialtone indicates the proper receive lines. The receive input step attenuator then adjusts the receive channel sensitivity based on reference levels as described above. The transmit lines are then selected and the transmit output step attenuator adjusts the transmit channel sensitivity based on reference levels.

FIG. 2 illustrates the flow models of the SIT "Automated 800 Learning Sequence." Due to the lack of regulation as it relates to Key and PBX system station sets, there is a wide variation of sidetone characteristics which may be encountered. Consequently, it is possible that occasionally, the learning method employed by the "CO Dialtone Method" may not provide optimal overall SIT system performance. The "Automated 800 Method" provides a very accurate means for the SIT system to "learn" the characteristics of a 4-wire telephone port interface.

The "Automated 800 Learning Method" involves interaction between a "Host" system located at the termination of the accessed telephone line and the "SIT" system located at the end user's location. The user places a call to a designated telephone number and is greeted by an "automated attendant" message. In the case of a voice application such as a headset interface, the message instructs the user to momentarily depress the system reset switch 258, place the "handset/headset" switch to the "headset" position and press a key on the telephone set keypad. The keystroke interrupts the "auto attendant" message and the "Host" sends a preamble to the "SIT" system. When the preamble is detected, the "Automated 800 Learning Method" is enabled.

Figure 3:
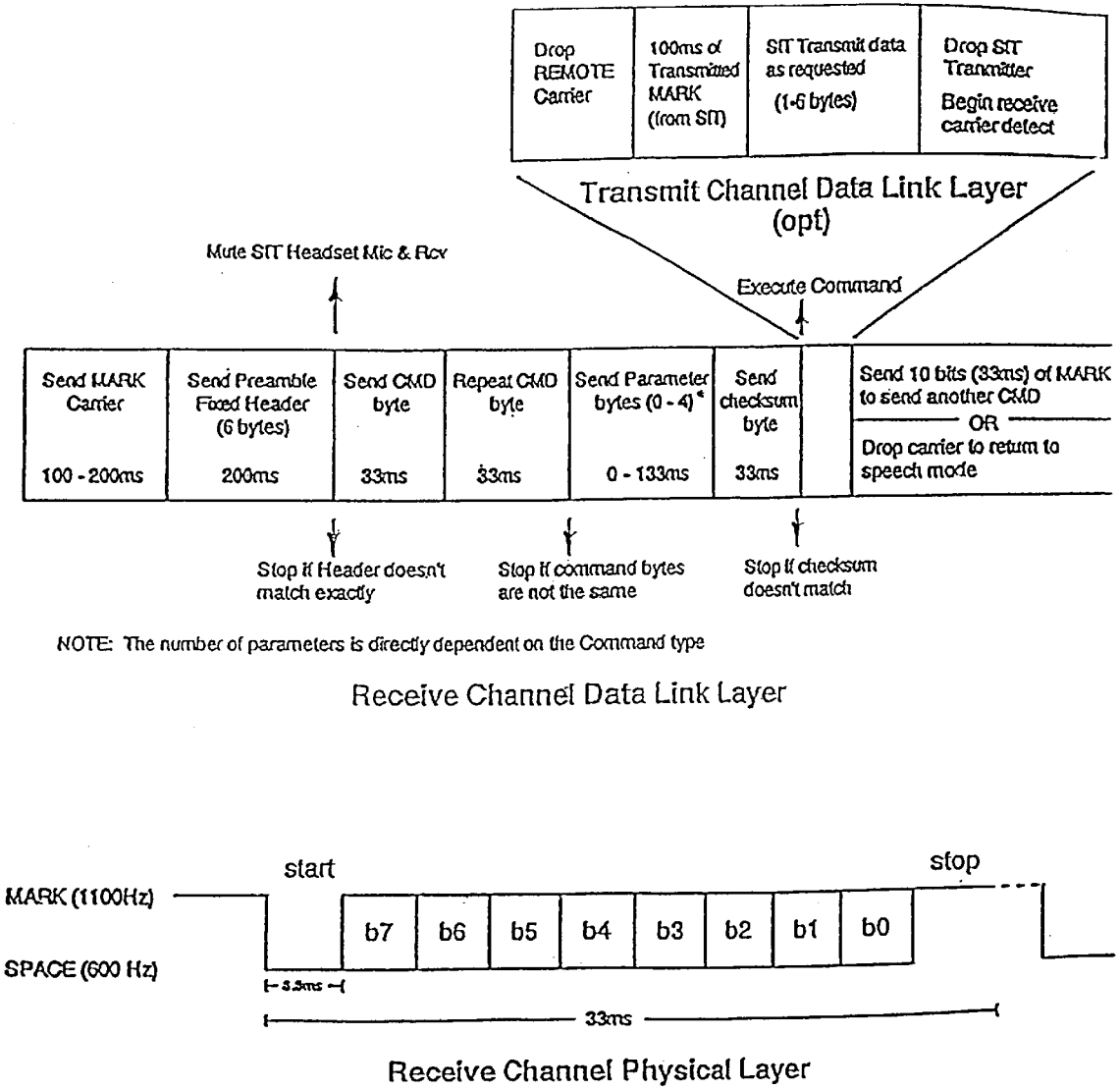
FIG. 3 illustrates a diagram of the SIT Data Transmission technique used for the "Automated 800" and "Manual 800" Learning Sequences of the present invention.

The "Automated 800 Learning Method" interaction between the "Host" and "SIT" systems is shown in the flow model illustrated in FIG. 2 and the "FSK Data Transmission Diagram" is illustrated in FIG. 3. The "Host" sends a preamble, for a predetermined amount of time, to the "SIT" system to initiate the "Automated 800 Learning Sequence." The "Host" then sends a 1 KHz reference signal, for a predetermined amount of time, for setup/calibration of the "SIT" system which it compares to an internal reference and uses to ensure proper setup/calibration of the "SIT" system transmit channel. When the incoming 1 KHz reference level is satisfied, the "Host" sends a level confirmation signal to the "SIT" system and a final "handshake" is generated between the "Host" and "SIT" systems signifying completion of the "Automated 800 Learning Sequence."

The SIT "Automated 800 Learning Sequence" begins by searching for the preamble sent by the Host. Once the preamble is located, the proper receive lines are located. The receive channel sensitivity is then adjusted in comparison to a receive level reference. Upon locating the proper receive lines, the transmit lines are selected and their sensitivity is adjusted in comparison to a transmit level reference signal.

A third and final interface method is the "Manual 800 Method." This method is used when either of the previously described learning sequences fail to provide optimal performance with a particular telephone port interface. The "Manual 800 Method" provides the user with the ability to interact with a trained telephony technician whom has the ability to adjust virtually all of the SIT parameters remotely with the use of a second "Host" system.

The SIT system "CO Dialtone" and "Automated 800 Learning" methods will select the most common configurations which satisfy the system's performance criteria. Occasionally this may not be the optimal "line configuration" selection for all interface environments. Since there are no regulatory requirements governing the specific characteristics for 4-wire handset port interfaces, there is a range of different configurations. It is not uncommon for an electronic telephone set to contain a handset port interface that will operate with multiple "line-configuration" settings. All of the configurations will provide acceptable system performance, occasionally however, a particular configuration will be more susceptible to unwanted radio-frequency interference or electromagnetic interference. In these cases, alternate combinations must be selected for optimal system performance.

Alternate combinations can be implemented by a user placing a call to a technical support staff member (tech) at a designated telephone-number. After determining the problematic symptoms, the technician has the ability to enable the "CO Dialtone Learning Sequence," the "Automated 800 Learning Sequence" or the "Manual 800 Method" modes of operation by sending the appropriate sequence preamble. In the "Manual 800 Method" mode of operation, the technician can directly manipulate and change the parameters associated with the crosspoint switch array 2, the receive input step attenuator RX-2 or the transmit output step attenuator TX-S.

Figure 6:
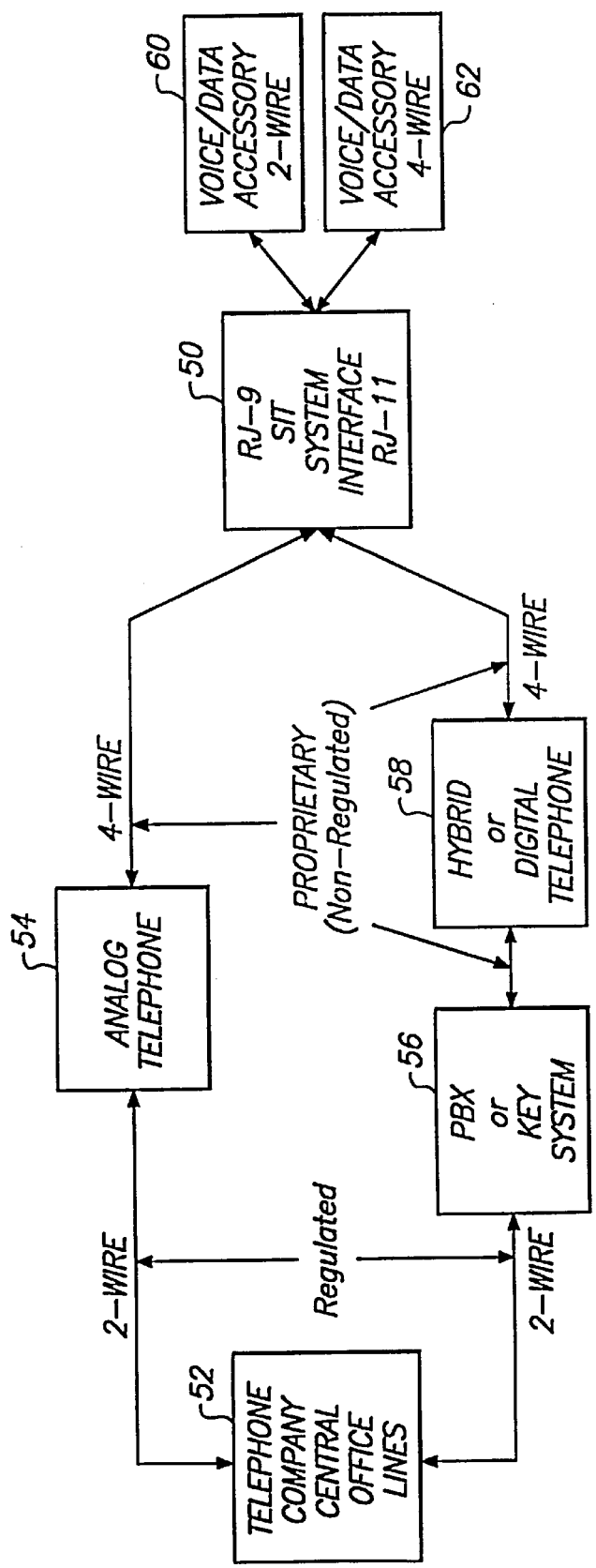
FIG. 6 illustrates a block diagram of the regulated and non-regulated portions of a typical telephone interface configuration as it relates to both the Central Office and the "Smart Interface Technology" (SIT) system connection of the present invention.

A block diagram of the regulated and non-regulated portions of a typical telephone interface configuration is illustrated in FIG. 6. The connection between the Central Office Lines of the telephone company 52 and either a telephone set 54 or a telephone system 56 is regulated. Accordingly, telephone sets and systems from many manufacturers can all be connected directly to the Central Office lines 52. The connection between a telephone system 56 and a hybrid or digital telephone set 58 is not regulated. The connection between a telephone set 54 or 58 and an accessory 60 or 62 is also not regulated. Therefore, unless designed to interface, one manufacturer's accessory may not operate with another manufacturer's telephone set.

The present invention provides a "Smart Interface Technology" (SIT) system interface 50 which provides an interface between accessories 60 and 62 and telephone base units 54 and 58, having different protocols. The SIT system interface 50 allows a voice/data accessory 60 or 62 to be used with telephone base units 54 and 58 from multiple manufacturers, each having different protocols.

Figure 7:
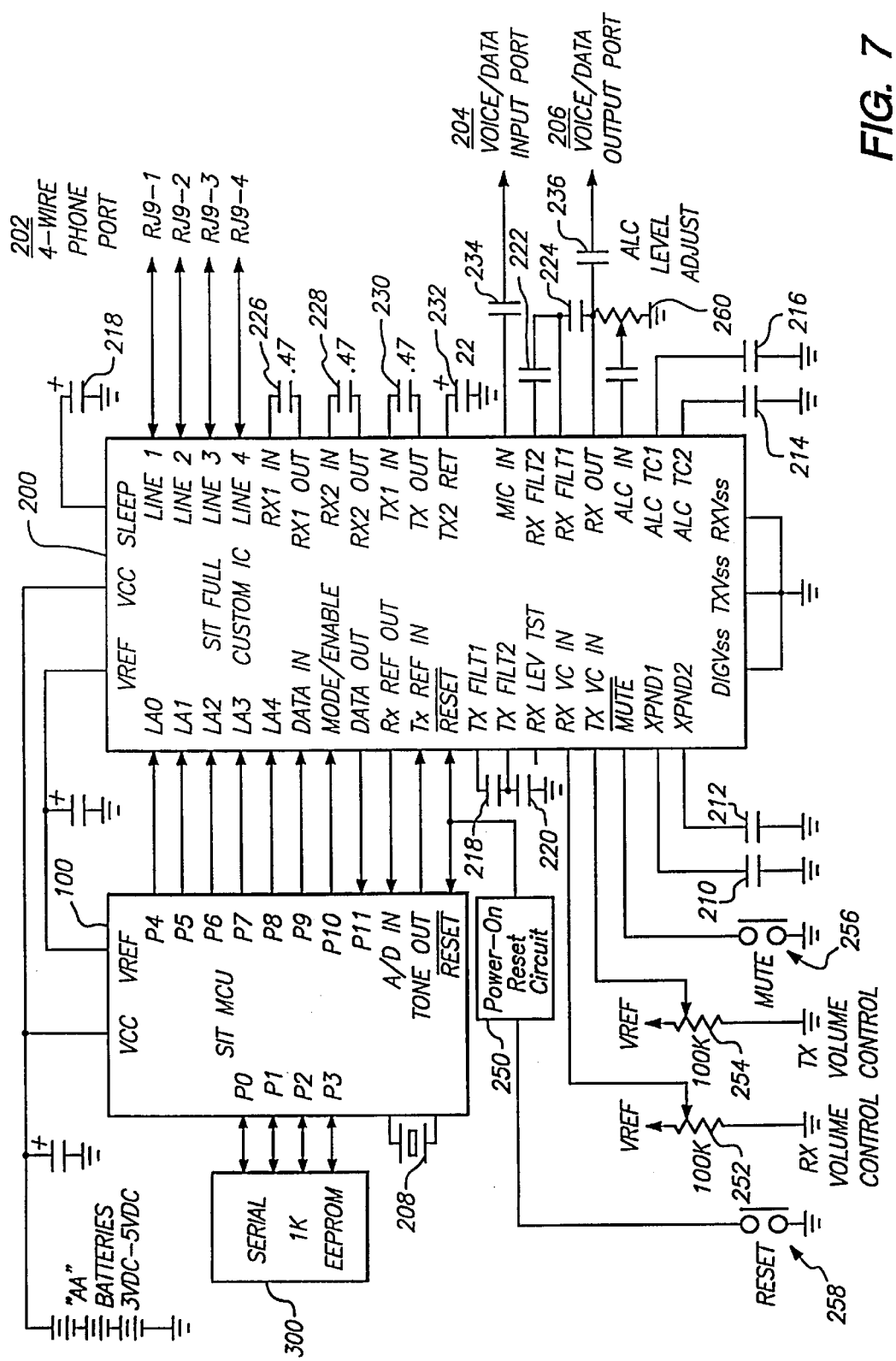
FIG. 7 illustrates a block diagram of the SIT system including a full-custom analog and semi-custom digital microcontroller integrated circuit.

A block diagram of the SIT interface system of the present invention is illustrated in FIG. 7. The preferred embodiment of the SIT interface system includes a full-custom SIT analog integrated circuit 200, a semi-custom digital microcontroller (MCU) 100, a 1-K serial EEPROM 300, a 4-wire telephone handset port 202 for coupling to a base unit, a voice or data 2-channel interface input port 204 and output port 206.

The analog integrated circuit 200 is coupled to the telephone handset port 202 through a 4-wire line interface. This interface allows for the establishment and selection of the 2-wire each send (Tx) and receive (Rx) line pairs. As is well known, the send and receive pairs are frequently not the same two lines in the port and may often share a common return signal line.

Outputs P4 through P10 of the Digital MCU 100 are coupled to inputs LA0 through LA4, DATA IN and MODE/ENABLE of the analog integrated circuit 200, respectively. It is through this coupling that the digital MCU 100 is able to control the various blocks within the analog integrated circuit 200, which will be discussed below.

A receive signal Rx REF OUT of the analog integrated circuit 200 is coupled to the analog/digital (A/D) input of the digital MCU 100 and provides a sample of the input signal which the analog integrated circuit 200 receives from the telephone base unit. The digital MCU 100 uses this information to determine if the appropriate line configuration has been selected and to control the receive and transmit channel sensitivities.

A signal TONE OUT from the digital MCU 100 is coupled to an input TXREF of the analog integrated circuit 200 and allows the digital MCU 100 to provide a 1 KHz calibration transmit tone, through the analog integrated circuit 200, to facilitate the appropriate selections of the transmit lines and transmit channel sensitivity setting.

An input RESET of both the Digital MCU 100 and analog integrated circuit 200 is coupled to a power-on reset circuit and switch 250. The reset input 250 allows the SIT system to be reset to activate one of the three "learning sequences" for the SIT system, of the present invention, to "learn" the characteristics of the telephone base unit. The reset circuit 250 is coupled to a reset switch 258 which is activated by a user.

A serial 1K EEPROM 300 is coupled to the digital MCU 100 and stores the "learned" characteristics of the attached telephone base unit after a successful "learning sequence" has been executed. The "learned" settings for controlling the analog integrated circuit 200 are thereby maintained within the EEPROM 300 in the event of a power failure.

A crystal oscillator 208 is coupled to inputs Xin and Xout of the digital MCU 100 for generation of a clock signal by the digital MCU 100 which controls the overall system timing of the SIT system interface 50 of the present invention.

The receive volume control 252 is coupled to an input RX VC IN of the analog integrated circuit 200 and is primarily used in voice applications whereby the user can adjust an output level of the received signal to achieve a comfortable listening level.

The transmit volume control 254 is coupled to an input TX VC IN of the analog integrated circuit 200 and is used as a fine tuning adjustment for precise level matching of the transmitted signal with the telephone base unit.

The mute switch 256 is coupled to an input MUTE of the analog integrated circuit 200 and is primarily used in voice applications whereby the user can disable the transmit preamplifier to temporarily prevent any signals from being transmitted to the telephone base unit.

The transmit channel voice or data input port 204 is coupled to an input MIC IN on the analog integrated circuit 200. This is the primary input point between the user and the SIT system of the present invention. In voice applications, the input MIC IN is preferably coupled to an electret type microphone.

The receive channel voice or data output port 206 is capacitively coupled from an output RX OUT of the analog integrated circuit 200 and provides the equalized incoming signal from the telephone base unit to the user. In voice applications, the output RX OUT is preferably coupled to an audio loudspeaker. The output RX OUT is also coupled to an input ALC IN of the analog integrated circuit 200 which acts as a compressor for large unwanted signals which are potentially harmful to the user or interface apparatus.

The digital MCU 100, analog integrated circuit 200 and serial 1K EEPROM 300 are preferably battery powered and can operate over a supply range of 3 to 5 volts DC. The digital MCU 100 is coupled to the bandgap DC reference voltage generated by the analog integrated circuit 200.

Timing capacitors 210, 212, 214 and 216 are coupled to inputs XPND1, XPND2, ALC TC2 and ALC TC1, of the analog integrated circuit 200, respectively. These timing capacitors 210, 212, 214 and 216 are then coupled to various blocks within the analog integrated circuit 200 and used to control the various attack and release times associated with expander, compressor and sleep circuits.

Filter capacitors 218, 220, 222 and 224 are coupled to inputs TX FILT1, TX FILT2, RX FILT1 and RX FILT2 of the analog integrated circuit 200, respectively. These filter capacitors 218, 220, 222 and 224 are then coupled to the receive and transmit channel output amplifiers and are used to set the channel frequency response characteristics.

Coupling capacitor 226 is coupled between a receive input RX1 IN and a receive output RX1 OUT of the analog integrated circuit 200. Coupling capacitor 228 is coupled between a receive input RX2 IN and a receive output RX2 OUT of the analog integrated circuit 200. Coupling capacitor 230 is coupled between a transmit input TX1 IN and a transmit output TX OUT of the analog integrated circuit 200. Coupling capacitor 232 is coupled between an input TX2 RET of the analog integrated circuit 200 and ground. Coupling capacitor 234 is coupled between the input MIC IN of the analog integrated circuit 200 and the voice/data input port 204. Coupling capacitor 236 is coupled between an output RX OUT of the analog integrated circuit 200 and the voice/data output port 206. The coupling capacitors 226, 228, 230, 232, 234 and 236 are used to remove DC offset and couple the AC input and output signals into and out of the various send and receive signal blocks found in both the receive and transmit channels of the analog integrated circuit 200.

Figure 8:
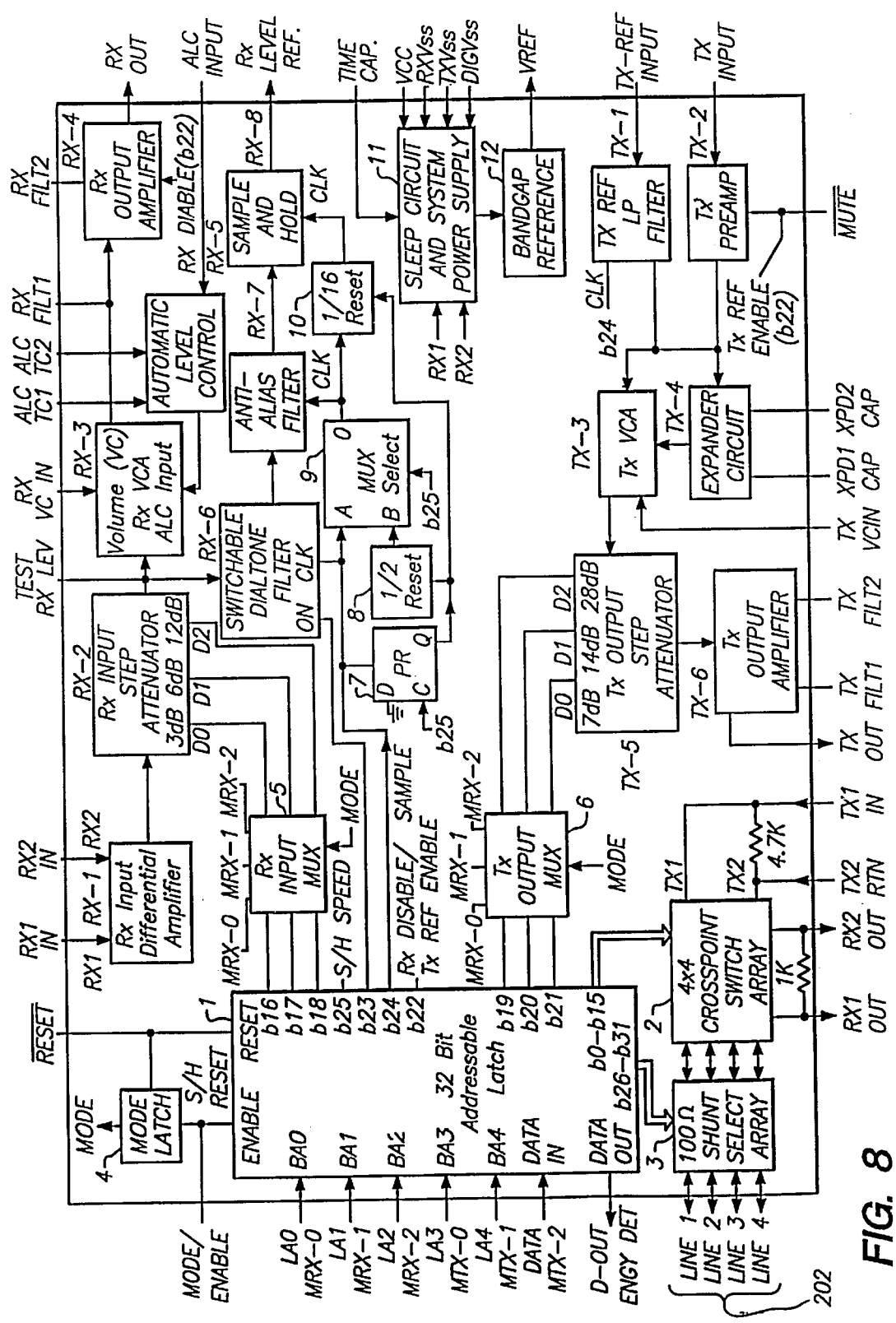
FIG. 8 illustrates a block diagram of the SIT full-custom analog integrated circuit of the present invention.

A system block diagram of the preferred embodiment of the SIT analog integrated circuit 200 is illustrated in FIG. 8. The SIT analog integrated circuit 200 is a full custom circuit that is designed to interface directly to the telephone base unit and is controlled by the semi-custom digital MCU 100, as illustrated in FIG. 7.

Within the analog integrated circuit 200, a 32 bit addressable latch 1 includes inputs BA0–BA4 which are coupled to the pins LA0–LA4 of the analog integrated circuit 200. An input DATA IN and output DATA OUT of the 32 bit addressable latch 1 are coupled to the pins DATA IN and DATA OUT, respectively, of the analog integrated circuit 200. An enable input ENABLE of the latch 1 is coupled to a mode latch 4 and to the pin ENABLE of the circuit 200. A reset input RESET of the latch 1 is coupled to the mode latch 4 and to the pin RESET of the circuit 200. The mode latch 4 is controlled by the signals from the pins ENABLE and RESET and saves a current mode which the circuit 200 is operating in. Outputs b0–b15 of the latch 1 are coupled to control a 4×4 crosspoint switch array 2. Outputs b16–b18 of the latch 1 are coupled to control a receive input multiplexer 5. Outputs b19–b21 of the latch 1 are coupled to control a transmit output multiplexer 6. Output b22 of the latch 1 provides a receive/transmit disable/enable control signal. Output b23 of the latch 1 is coupled to an input ON of a switchable dialtone filter RX-6. Output b24 of the latch 1 is coupled to an input PR of a flip-flop 7, to an input A of a multiplexer 9 and to a clock input CLK of the switchable dialtone filter RX-6. Output b25 of the latch 1 provides a signal S/H SPEED which is coupled to an input C of a flip-flop 7 and to a select input of the multiplexer 9. Outputs b26–b31 of the latch 1 are coupled to control a 100 ohm shunt select array 3.

The four lines of the 4-wire phone port 202 are coupled as inputs to the array 3. The array 3 is also coupled to the array 2. Outputs of the array 2 are coupled to the pins RX1 OUT and RX2 OUT of the analog integrated circuit 200 to provide an output received signal. Inputs of the array 2 are coupled to the pins TX1 IN and TX2 RTN of the circuit 200, to receive a transmit signal. Outputs of the multiplexer 5 are coupled as inputs D0, D1 and D2 of a receive input step attenuator RX-2. Two sets of control inputs MRX-1, 2, 3, and BITS 16, 17, 18 are coupled to multiplexer 5. Outputs of multiplexer 6 are coupled as inputs D0, D1 and D2 of a transmit output step attenuator TX-5. Two sets of control inputs MTX-1, 2, 3 and BITS 19, 20, 21 are coupled to multiplexer 6. An output MODE of the mode latch 4 is coupled to the selection control inputs of multiplexers 5 and 6.

The receive input pins RX1 IN and RX2 IN of the analog integrated circuit 200 are coupled as inputs to a receive input differential amplifier RX-1. An output of the amplifier RX-1 is coupled as an input to the receive input step attenuator RX-2. An output of the attenuator RX-2 is coupled as an input to a receive voltage controlled amplifier (VCA) RX-3, as an input to a switchable dialtone filter RX-6 and to a pin TEST RX LEV of the circuit 200 for testing the level of the received signal output from the attenuator RX-2.

A receive voltage control pin RX VC IN of the circuit 200 is coupled as a control input to the receive VCA RX-3. Automatic level control (ALC) pins ALC TC1, ALC TC2 and ALC INPUT of the circuit 200 are coupled as inputs to an ALC circuit RX-5. An output of the ALC circuit RX-5 is coupled as an ALC input to the receive VCA RX-3. An input of the receive VCA RX-3 is coupled to a receive filter pin RX FILT1 of the circuit 200 and as an input to a receive output amplifier RX-4. An output b22 of the latch 1 is coupled as a receive disable input to the amplifier RX-4. An output of the amplifier RX-4 is coupled to a receive filter pin RX FILT2 of the circuit 200. A receive output signal is provided as an output from the amplifier RX-4 and coupled to a receive output pin RX OUT of the circuit 200.

A transmit reference input pin TX REF INPUT of the circuit 200 is coupled as an input to a transmit reference filter TX-1. An output b24 of the latch 1 is coupled as a clock input to the filter TX-1. A transmit input pin TX INPUT of the circuit 200 is coupled as an input to a transmit pre-amplifier circuit TX-2. A mute pin MUTE of the circuit 200 is coupled as an input to the pre-amplifier circuit TX-2. The output b22 of the latch 1 is coupled as transmit enable input to the pre-amplifier circuit TX-2. An output of the pre-amplifier circuit TX-2 is coupled to an output of the filter TX-1 and as an input to a transmit VCA TX-3 and an expander circuit TX-4.

Pins XPDI CAP and XPD2 CAP of the circuit 200 are coupled as inputs to the expander circuit TX-4. An output of the expander circuit TX-4 is coupled as an input to the transmit VCA TX-3. A transmit pin TX VCIN of the circuit 200 is coupled to an input of the transmit VCA TX-3. An output of the transmit VCA TX-3 is coupled as an input to the transmit output step attenuator TX-5. An output of the attenuator TX-S is coupled as an input to a transmit output amplifier TX-6. Transmit filter pins TX FILT1 and TX FILT2 of the circuit 200 are coupled to inputs of the amplifier TX-6. A transmit output signal is output from the amplifier TX-6 and coupled to the transmit output pin TX OUT of the circuit 200.

An input D of the flip-flop 7 is coupled- to ground. An output Q of the flip-flop 7 is coupled as a reset input to a ½ dividing circuit 8 and a ¹⁄₁₆ dividing circuit 10. An output of the ½ dividing circuit 8 is coupled as an input B to the multiplexer 9. An output O of the multiplexer 9 is coupled as an input to the ¹⁄₁₆ dividing circuit 10 and to an anti-alias filter circuit RX-7. An output of the switchable dialtone filter circuit RX-6 is coupled as an input to the filter RX-7. An output of the filter RX-7 is coupled as an input to a sample and hold circuit RX-8. An output of the ¹⁄₁₆ dividing circuit 10 is coupled as an input to the sample and hold circuit RX-8. An output of the sample and hold circuit RX-8 is coupled to a receive level reference pin RX LEVEL REF of the circuit 200.

A timing capacitor pin TIME CAP of the circuit 200 is coupled as an input to a sleep circuit and system power supply 11. Power supply input pins VCC, RXVss, TXVss and DIGVss of the circuit 200 are coupled as inputs to the sleep circuit and system power supply 11. The inputs RX1 and RX2 to the amplifier RX-1 are coupled as inputs to the sleep circuit and system power supply 11. An output of the sleep circuit and system power supply 11 is coupled to a bandgap reference circuit 12. An output of the bandgap reference circuit 12 is coupled to a voltage reference pin VREF of the circuit 200.

The digital MCU 100 is able to address and manipulate the 32 bit addressable latch 1, thereby controlling the 4×4 crosspoint switch array 2 and 100 ohm resistor shunt array 3, within the analog integrated circuit 200. The crosspoint switch array 2 has four input ports which are directly coupled to a four line telephone base unit jack 202 through the array 3, as illustrated by the lines 1–4. The 100 ohm resistor shunt array 3 contains six switchable shunt resistors, is configured in parallel with the crosspoint switch array 2 input ports, and is capable of providing a 100 ohm shunt resistance between any of the 4 line inputs.

When a telephone accessory including the interface system of the present invention is first plugged into a telephone base unit, the accessory may not operate because it has not yet been optimally configured to electronically communicate with the telephone base unit. A Central Office dialtone is applied by the telephone base unit to two of the lines of the jack 202. Under control of the digital MCU 100, the addressable latch 1 manipulates the crosspoint array 2 and the shunt select array 3 by sequentially coupling pairs of line input ports until a CO dialtone is sensed by the digital MCU 100 in the receive channel. This information is then latched for further analysis by the digital MCU 100.

The two receive lines through which a CO dialtone is detected, are coupled to the receive input differential amplifier RX-1 which is terminated with a known resistive impedance. In the preferred embodiment, the resistive impedance is 1K ohm.

A 28 dB energy variance exists between telephones that are commercially available. Accordingly, in a voice application, a telephone headset or other accessory that is configured to work with one telephone base unit could provide an uncomfortably loud signal when used with a second base unit or be significantly quiet when used with a third telephone base unit. To solve this problem, the output of the differential amplifier RX-1 is coupled to the input of the receive step attenuator RX-2. The receive step attenuator RX-2 is initially configured to provide maximum attenuation and then increases the receive signal in 4 dB increments until a predetermined target reference level is sensed by the digital MCU 100, thereby equalizing the receive channel sensitivity. The receive step attenuator RX-2 is coupled to the receive input multiplexer 5 which is controlled by the 32 bit addressable latch 1. The digital MCU 100 controls both the bit addressable latch 1 and the receive input multiplexer 5 thereby setting the attenuation by the step attenuator RX-2.

The equalized receive signal is then coupled to the voltage controlled amplifier RX-3 which can have fixed gain or allow the user to manually control the volume level of the receive signal through a port RX VC IN which is coupled to the voltage controlled amplifier RX-3. An output of the automatic level control circuit RX-5 is also coupled to an ALC control input on the voltage controlled amplifier RX-3 and is capable of controlling the amplifier gain.

The automatic level control circuit RX-5 acts as a dynamic output limiting system with an overall dynamic range of 40 dB. The automatic level control circuit RX-5 input samples the output level of the receive channel and has a selectable limiting threshold as shown in FIG. 7 which is adjusted using the ALC level adjust circuit 260. The automatic level control circuit RX-5 is capable of limiting the output level of the receive signal to a predetermined level to prevent large unwanted and potentially harmful signals from reaching a user. In voice applications, the user's ears will be protected from prolonged high decibel sounds by the automatic level control circuit RX-5, thereby preventing potential damage to the user's hearing. The ALC timing capacitors 214 and 216, illustrated in FIG. 7, are coupled to the pins ALC TC1 and ALC TC2 and are used to set the attack and release timing characteristics of the ALC circuit RX-5.

The equalized receive signal is output from the receive VCA RX-3 and coupled as an input to the receive output amplifier RX-4 which is capable of driving resistive, capacitive and inductive loads via the receive output port RX OUT for compatibility with voice or data interfaces. The filtering capacitors 222 and 224, illustrated in FIG. 6, and coupled to the pins RX FILT1 and RX FILT2 of the circuit 200 are used to determine the receive channel frequency response.

The digital MCU 100 monitors the receive signal by sampling the signal through the receive level reference port RX LEVEL REF. The receive signal sample for the digital MCU 100 is taken at the output of the receive step attenuator RX-2 and is filtered by the dialtone filter RX-6, then the anti-alias filter RX-7. The receive signal sample is finally coupled into the sample and hold circuit RX-8 prior to being passed on to the receive level reference port RX LEVEL REF. The receive level reference port RX LEVEL REF is coupled directly to the A/D input of the digital MCU 100. The digital MCU 100 controls the dialtone filter RX-6, anti-alias filter RX-7 and sample and hold circuit RX-8 via the 32 bit addressable latch 1 and synchronizes these switched capacitor filters with the use of the clock circuitry shown in the blocks 7, 8, 9 and 10.

Once the receive lines are determined and the channel sensitivity is adjusted for optimal performance, the transmit lines and sensitivity are then determined. Based on the selected receive lines, certain transmit line configurations are highly probable and are prioritized in the system algorithms.

Utilizing the sidetone characteristics of telephone base units, the digital MCU 100 will continue to monitor the receive signal path via the receive level reference output port RX LEVEL REF for calibration of the transmit channel.

A transmit preamplifier TX-2 is used as the interface for the user voice or data input signal and provides some preamplification of the input signal in addition to a channel mute user portion. It should be noted that this mute stage is disabled during the "learning" process to prevent the user from inserting a variant signal into the transmit path. The output of the transmit preamplifier TX-2 is coupled to the transmit VCA TX-3 and the transmit expander circuit TX-4.

During a "learning" procedure, the digital MCU 100 generates a 1 KHz transmit calibration signal into the transmit reference input port TX REF INPUT. The 1 KHz calibration signal is then coupled into the transmit reference low pass filter TX-1 which is controlled by the 32 bit addressable latch 1 and hence the digital MCU 100. The transmit reference low pass filter TX-1 filters out the odd harmonics of the calibration signal and outputs the result to the transmit VCA TX-3 and the expander circuit TX-4.

The input of the expander circuit TX-4 is coupled to the output of the transmit preamplifier TX-2 and the transmit reference low pass filter TX-1. The expander circuit TX-4 differentiates input noise from the desired signal. The expander circuit TX-4 output is coupled to a control input of the transmit VCA TX-3 and provides electronic noise reduction by attenuating the transmit VCA gain as it relates to unwanted background noise. The timing capacitors 210 and 212, illustrated in FIG. 7 and coupled to the pins XPD1 and XPD2 are used to determine the expander attack and release characteristics.

The transmit VCA TX-3 receives its input from the transmit preamplifier TX-2 and transmit reference low pass filter TX-1 and serves two primary purposes. The transmit VCA TX-3 works in conjunction with the transmit expander circuit TX-4 to provide electronic noise reduction and provides an overall transmit channel output level adjustment to allow precise interface matching via an optional transmit volume control function. The transmit volume control circuit 254 is illustrated in FIG. 7. The output of the transmit VCA TX-3 is coupled to the transmit output step attenuator TX-5.

The digital MCU 100 will begin manipulating the crosspoint switch array 2 by sequentially coupling pairs of the transmit output ports starting with the most probable pairs defined in the system algorithms. A description, which illustrates the system's switching algorithms, is shown in detail in FIGS. 4 and 5. The 1 KHz transmit calibration signal is therefore applied to the telephone base unit via the jack lines 202 until the 1 KHz signal is sensed by the digital MCU 100 at the receive level reference output RX LEVEL REF. When the digital MCU 100 senses the 1 KHz signal it will have successfully located the appropriate transmit lines and will latch the information and begin the transmit output step attenuator TX-5 adjustment.

A 49 dB variance in transmit line sensitivity exists between telephone base units that are commercially available. A precise sensitivity interface match is critical for optimal performance of the transmitted signal with the various telephone base units. To solve this problem, the signal output of the transmit VCA TX-3 is coupled into the transmit output step attenuator TX-5 which effects the transmit output level. The transmit output step attenuator TX-5 is coupled to the transmit output multiplexer 6 which is controlled by the 32 bit addressable latch 1 and therefore the digital MCU 100. The digital MCU 100 will adjust the transmit step attenuator in 7 dB increments until a predetermined 1 KHz target reference level is sensed by the digital MCU 100, thereby equalizing the transmit channel sensitivity to the appropriate level. The signal output of the transmit output step attenuator TX-5 is coupled to the transmit output amplifier TX-6.

The transmit output amplifier TX-6 is capable of providing a voltage or current drive output and driving resistive, capacitive or inductive loads. A coupling capacitor 230 is used to couple the transmit output signal from the pin TX OUT into the crosspoint switch array 2 through the transmit input pin TX1 IN. The filtering capacitors 218 and 220, illustrated in FIG. 7 and coupled to the pins TX FILT1 and TX FILT2 are used to determine the transmit channel frequency response.

To conserve on battery life of the power supply 11, the analog integrated circuit 200 includes the sleep circuit within the power supply 11. The sleep circuit 11 is coupled between the VCC port and the main IC block power supplies. The sleep circuit control input is coupled to the inputs RX1 and RX2 of the receive differential amplifier RX-1. If the incoming broadband noise on the receive lines drops below a certain level, preferably −65 dBV, the sleep circuit begins a timing sequence as determined by the value of the sleep timing capacitor 218. If the broadband receive signal does not exceed the −65 dBV threshold within the programmed timeframe, the analog integrated circuit 200 enters into the sleep mode and shuts down. When the broadband receive signal exceeds the −65 dBV threshold, the sleep timing sequence resets and the analog integrated circuit "wakes up" within 5 milliseconds (ms).

The preferred embodiment for the analog integrated circuit 200 is powered by any convenient power source which can be directly connected to the pin VCC to serve as the primary circuit power supply. The bandgap reference circuit 12 develops a stable reference voltage for use internally in the analog integrated circuit 200 and externally for the digital MCU 100 and VCA control voltages.

Figure 9:
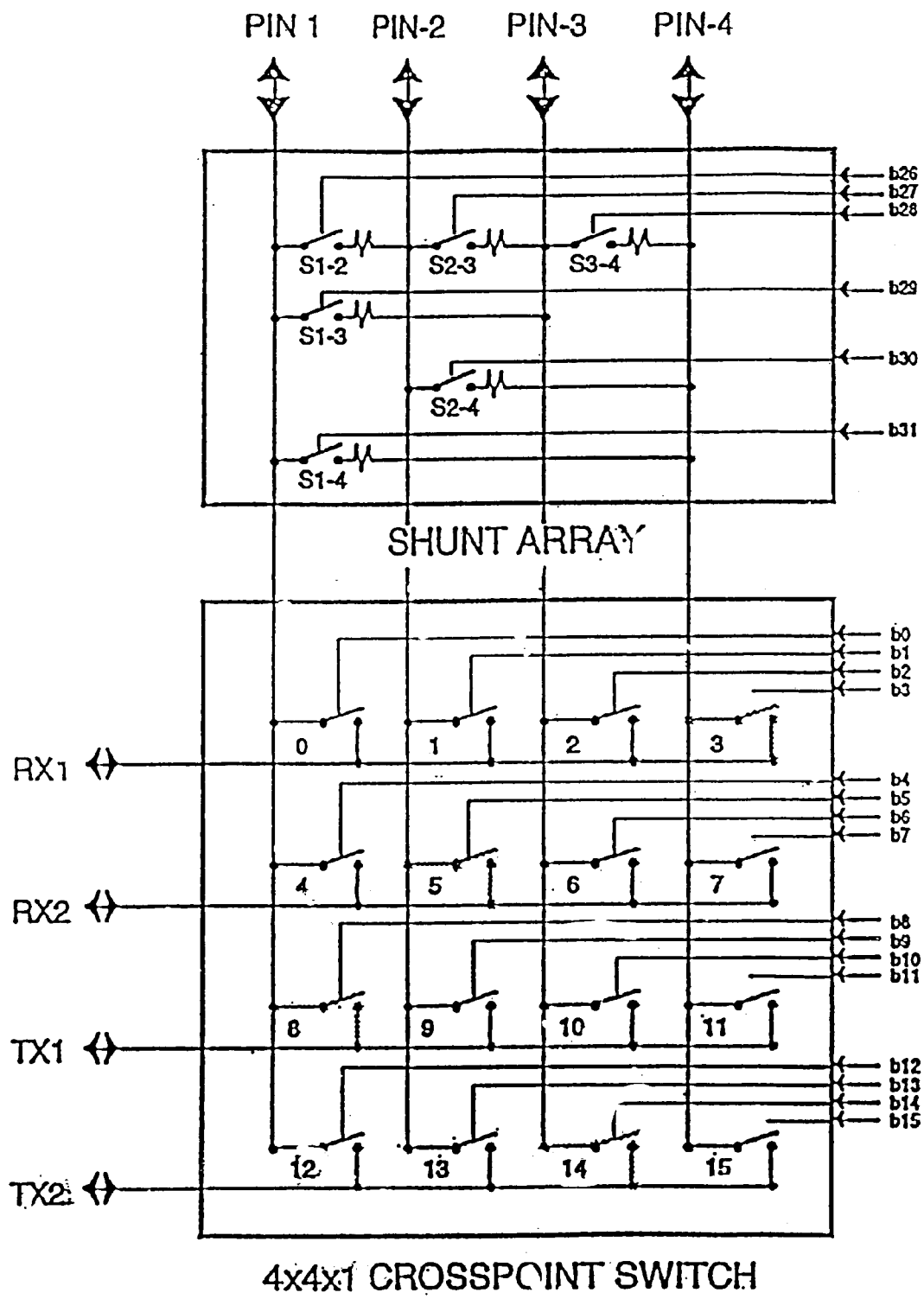
FIG. 9 illustrates a block diagram of 4×4 crosspoint switch and shunt resistor arrays.

A block diagram of the 4×4 crosspoint switch array 2 and the 100 ohm shunt resistor array 3 is illustrated in FIG. 9. The crosspoint switch array consists of a 4×4 matrix of analog switches designed to connect lines 1–4 of the 4-wire phone port 202 to the two transmit and two receive channels in any order and polarity. It is under the control of the digital MCU 100, through the bit addressable latch 1, that the appropriate transmit and receive lines are determined, as described above.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the method of the present invention could be implemented in several different ways and the apparatus disclosed above is only illustrative of the preferred embodiment of the present invention and is in no way a limitation.

We claim:

1. A CO Dialtone Learning Sequence method of learning the characteristics of a telephone set with a 4-wire port interface which comprises the steps of:
   a. searching the 4-wire port interface of the telephone set for a CO dialtone;
   b. detecting a CO dialtone;
   c. selecting receive lines;
   d. setting the receive channel sensitivity by comparison with receive level references;
   e. selecting transmit lines; and
   f. setting the transmit channel sensitivity by comparison with a transmit reference signal.

2. A Host Automated 800 Learning Sequence method of learning the characteristics of a telephone set with a 4-wire port interface which comprises the steps of:
   a. searching the 4-wire port interface of the telephone set for a DTMF tone sent by a remote host;
   b. sending a preamble to a user;
   c. disabling a reference signal;
   d. enabling a level detect system;
   e. measuring an incoming transmit signal;
   f. comparing the transmit signal against a transmit level reference;
   g. sending a level confirmation signal.

3. A SIT Automated 800 Learning Sequence method of learning the characteristics of a telephone set with a 4-wire port interface which comprises the steps of:
   a. searching the 4-wire port interface of the telephone set for a preamble;
   b. detecting the preamble;
   c. selecting receive lines;
   d. setting the receive lines' channel sensitivity by comparison with a receive level reference;
   e. selecting transmit lines; and
   f. setting the transmit lines' channel sensitivity by comparison with a transmit reference signal.

4. A Manual 800 method of learning the characteristics of any telephone with a 4-wire port interface which comprises the steps of:
   a. enabling a Manual 800 mode;
   b. sending a preamble to the telephone set from a remote host wherein a human operator is positioned at a location of the remote host;
   c. adjusting sensitivity of a transmit channel under control of the human operator;
   d. adjusting sensitivity of a receive channel under control of the human operator; and
   e. disabling the Manual 800 mode.

5. A central office dialtone method of configuring a telecommunications interface system having a signal processing circuit having a receive signal path and a transmit signal path to appropriately interface a telephone accessory with a handset port of a telephone base unit having a plurality of electrical contacts, whereby the interface system is configured for appropriately coupling the output contacts to the receive signal path and the input contacts to the transmit signal path including two electrical output contacts and two electrical input contacts, the method comprising steps of:
   a. searching the plurality of electrical contacts of the handset port of the telephone base unit for a central office dialtone;
   b. detecting the central office dialtone across the input electrical contacts;
   c. electrically coupling the input electrical contacts to the receive signal path;
   d. adjusting sensitivity of the receive signal path by comparing a level of the central office dialtone with a receive level reference; and
   e. electrically coupling the output electrical contacts to the transmit signal path.

6. The method according to claim 5 further comprising a step of adjusting sensitivity of the transmit signal path by applying a transmit reference signal to the transmit signal path and monitoring receive signal path which receives the transmit reference signal via a sidetone characteristic of the telephone base unit.

7. The method according to claim 5 wherein the step of electrically coupling the input electrical contacts to the receive signal path includes a step of appropriately configuring a switch matrix.

8. A remote host automated method of configuring a telecommunications interface system having a signal processing circuit having a receive signal path and a transmit signal path to appropriately interface a telephone accessory with a handset port of a telephone base unit having a plurality of electrical contacts, whereby the interface system is configured for appropriately coupling the output contacts to the receive signal path and the input contacts to the transmit signal path including two electrical output contacts and two electrical input contacts, the method comprising steps of:

a. forming a telephone connection between a remote host and the telephone base unit;

b. searching the plurality of electrical contacts of the handset port of the telephone base unit for a signal sent by the remote host;

c. detecting the signal sent by the host across the input electrical contacts;

d. electrically coupling the input electrical contacts to the receive signal path;

e. adjusting sensitivity of the receive signal path by comparing a level of the signal sent by the host present in the receive signal path to a receive level reference;

f. disabling the signal sent by the host; and g. electrically coupling the output electrical contacts to the transmit signal path.

9. The method according to claim 8 further comprising a step of adjusting sensitivity of the transmit signal path by applying a transmit reference signal to the transmit signal path and monitoring receive signal path which receives the transmit reference signal via a sidetone characteristic of the telephone base unit.

10. The method according to claim 8 wherein the step of electrically coupling the input electrical contacts to the receive signal path includes a step of appropriately configuring a switch matrix.

11. A manual method of configuring a telecommunications interface system having a signal processing circuit having a receive signal path and a transmit signal path to appropriately interface a telephone accessory with a handset port of a telephone base unit having a plurality of electrical contacts, whereby the interface system is configured for appropriately coupling the output contacts to the receive signal path and the input contacts to the transmit signal path including two electrical output contacts and two electrical input contacts, the method comprising steps of:

a. forming a telephone connection between a remote host and the telephone base unit wherein a human operator is positioned at a location of the remote host;

b. electrically coupling the input electrical contacts to the receive signal path under control of the human operator;

c. adjusting sensitivity of the receive signal path under control of the human operator;

d. electrically coupling the output electrical contacts to the transmit signal path under control of the human operator; and e. adjusting sensitivity of the transmit channel sensitivity under control of the human operator.

12. The method according to claim 4 further comprising a step of enabling switching algorithms.

* * * * *

UNITED STATES PATENT AND TRADEMARK OFFICE
CERTIFICATE OF CORRECTION

PATENT NO. : 5,937,031

DATED : August 10, 1999

INVENTOR(S) : Bruce W. Stelman

It is certified that error appears in the above-identified patent and that said Letters Patent is hereby corrected as shown below:

In column 4, line 14, delete "TX-S" and insert --TX-5--.

In column 7, line 48, delete "TX-S" and insert --TX-5--.

In column 9, line 53, delete "leaming" and insert --learning--.

Signed and Sealed this

Twenty-eighth Day of December, 1999

Attest:

Q. TODD DICKINSON

Attesting Officer

Acting Commissioner of Patents and Trademarks